(12) United States Patent
Kim

(10) Patent No.: US 11,841,958 B2
(45) Date of Patent: Dec. 12, 2023

(54) METHOD AND ELECTRONIC DEVICE FOR CONNECTION TO EXTERNAL DEVICE

(71) Applicant: Samsung Electronics Co., Ltd., Gyeonggi-do (KR)

(72) Inventor: Jeongmin Kim, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 557 days.

(21) Appl. No.: 16/977,505

(22) PCT Filed: Feb. 28, 2019

(86) PCT No.: PCT/KR2019/002399
§ 371 (c)(1),
(2) Date: Sep. 2, 2020

(87) PCT Pub. No.: WO2019/168359
PCT Pub. Date: Sep. 6, 2019

(65) Prior Publication Data
US 2020/0394294 A1 Dec. 17, 2020

(30) Foreign Application Priority Data
Mar. 2, 2018 (KR) .................. 10-2018-0025282

(51) Int. Cl.
G06F 7/04 (2006.01)
G06F 21/60 (2013.01)
(Continued)

(52) U.S. Cl.
CPC ............ *G06F 21/606* (2013.01); *G06F 18/22* (2023.01); *G06F 21/36* (2013.01); *G06V 10/44* (2022.01);
(Continued)

(58) Field of Classification Search
CPC ...... G06F 21/606; G06F 21/36; G06F 21/335; G06F 21/44; H04W 12/50; H04W 12/06; H04L 9/0861; H04L 63/10
See application file for complete search history.

(56) References Cited

U.S. PATENT DOCUMENTS 9,147,057 B2 * 9/2015 Raffa ..................... G06V 40/20
9,667,608 B2 5/2017 Witherspoon
(Continued)

FOREIGN PATENT DOCUMENTS

JP 10-40376 A 2/1998
JP 2008-197977 A 8/2008
(Continued)

OTHER PUBLICATIONS

Hsin et al. From Finger Gesture to Finger Choreography: Enabling 3D Live Performances on Smartphones, IEEE, Jul. 18, 2014, pp. 114-119. (Year: 2014).*
(Continued)

*Primary Examiner* — Philip J Chea
*Assistant Examiner* — Jenise E Jackson
(74) *Attorney, Agent, or Firm* — Cha & Reiter, LLC

(57) ABSTRACT

Various embodiments of the present invention relate to a device and method for providing connection between an electronic device and other electronic devices through figure input. According to one embodiment, a first electronic device comprises a display, a processor operatively connected to the display, and a memory operatively connected to the processor, wherein the memory may include instructions by which, when executed, the processor: generates a first figure for connection authentication of a second electronic device; displays the first figure through the display; transmits a signal related to the first figure to the first electronic device; when a response signal corresponding to
(Continued)

the signal related to the first figure is received, identifies a second figure included in the response signal; determines whether the second electronic device is authenticated, on the basis of a similarity between the first figure and the second figure; and establishes connection to the second electronic device on the basis of a result of the determining.

14 Claims, 13 Drawing Sheets

(51) Int. Cl.
| | |
|---|---|
| *G06F 21/36* | (2013.01) |
| *H04W 12/06* | (2021.01) |
| *H04W 12/50* | (2021.01) |
| *G06V 30/32* | (2022.01) |
| *G06F 18/22* | (2023.01) |
| *G06V 10/74* | (2022.01) |
| *G06V 10/44* | (2022.01) |

(52) U.S. Cl.
CPC .......... *G06V 10/761* (2022.01); *G06V 30/36* (2022.01); *G06V 30/373* (2022.01); *H04W 12/06* (2013.01); *H04W 12/50* (2021.01)

(56) References Cited

U.S. PATENT DOCUMENTS

| | | | |
|---|---|---|---|
| 10,558,976 B1* | 2/2020 | Ketharaju | ........... H04L 63/0861 |
| 2008/0072045 A1* | 3/2008 | Mizrah | ................... G06F 21/36 |
| | | | 713/171 |
| 2008/0301778 A1* | 12/2008 | Fritz | ...................... H04L 63/08 |
| | | | 726/4 |
| 2013/0182897 A1* | 7/2013 | Holz | ................. G01B 11/2433 |
| | | | 382/103 |
| 2014/0090040 A1* | 3/2014 | Abuelsaad | .............. G06F 21/31 |
| | | | 726/7 |
| 2015/0215292 A1 | 7/2015 | Novicov | |
| 2016/0371476 A1* | 12/2016 | Turgeman | ........... G06F 3/04842 |
| 2017/0061231 A1* | 3/2017 | Higa | ........................ G06T 7/00 |
| 2017/0098065 A1* | 4/2017 | Vaughn | ................. G06F 21/316 |
| 2017/0140169 A1* | 5/2017 | Boger | ................. G06F 3/04886 |
| 2017/0199997 A1* | 7/2017 | Fadell | ................... H04L 9/3231 |
| 2017/0339128 A1* | 11/2017 | Lim | ................... H04L 63/0861 |

FOREIGN PATENT DOCUMENTS

| | | |
|---|---|---|
| JP | 2014-157399 A | 8/2014 |
| KR | 10-2011-0050148 A | 5/2011 |
| KR | 10-2014-0029340 A | 3/2014 |
| KR | 10-2017-0110266 A | 10/2017 |

OTHER PUBLICATIONS

Nesselrath et al., Combining Speech, Gaze, and Micro-Gestures for the Multimodal Control of In-Car Functions, IEEE, Sep. 1, 2016, pp. 190-193. (Year: 2016).*

Notice Of Preliminary Rejection dated Jul. 2, 2022.

Notice of Patent Grant dated Jan. 12, 2023.

* cited by examiner

METHOD AND ELECTRONIC DEVICE FOR CONNECTION TO EXTERNAL DEVICE

CROSS-REFERENCE TO RELATED APPLICATION(S)

This application is a National Phase Entry of PCT International Application No. PCT/KR2019/002399, which was filed on Feb. 28, 2019, and claims priority to Korean Patent Application No. 10-2018-0025282, which was filed on Mar. 2, 2018, the contents of which are incorporated herein by reference.

TECHNICAL FIELD

Various embodiments relate to a device and a method for connection of an electronic device to external device.

BACKGROUND ART

With the development of semiconductor technology and wireless communication technology, various types of electronic devices, such as a mobile communication terminal, a personal digital assistant (PDA), an electronic organizer, a smartphone, a tablet computer, a personal computer (PC), and a wearable device, are being used.

An electronic device may establish connection with a different electronic device by various methods. For example, an electronic device may control a different electronic device or may interwork with the different electronic device to perform various operations through wired/wireless communication connection with the different electronic device.

DISCLOSURE OF INVENTION

Technical Problem

An electronic device needs a connection authentication process for a different electronic device in wireless connection with the different electronic device in order to restrict connection of an illegal electronic device. The electronic device may require a method for easily establishing connection with the different electronic device.

According to various embodiments of the disclosure, an electronic device may provide a device and a method for authentication for connection with another electronic device.

Technical aspects to be achieved in the disclosure are not limited to the technical aspects mentioned above, and other technical aspects not mentioned will be clearly understood by those skilled in the art from the following description.

Solution to Problem

A first electronic device according to various embodiments may include: a display; a processor configured to be operatively connected to the display; a memory configured to be operatively connected to the processor, wherein the memory may include instructions that, when executed, cause the processor to: generate a first figure for connection authentication of a second electronic device; display the first figure on the display; transmit a signal relating to the first figure to the second electronic device; identify a second figure included in a response signal when receiving the response signal corresponding to the signal relating to the first figure; determine whether the second electronic device is authenticated, based on a similarity between the first figure and the second figure; and establish connection with the second electronic device, based on a determination result.

A second electronic device according to various embodiments may include: a display; a processor configured to operatively connected to the display; and a memory configured to be operatively connected to the processor, wherein the memory may include instructions that, when executed, cause the processor to: receive a signal relating to a first figure for connection authentication of a first electronic device; switch to an input mode, based on the signal; receive an input of a second figure corresponding to the first figure for connection authentication in the input mode; and transmit a signal relating to the input to the first electronic device.

Advantageous Effects of the Invention

A first electronic device and an operating method thereof according to various embodiments may perform authentication for connection with a second electronic device using a figure, thereby facilitating establishment of connection with the second electronic device.

A second electronic device and an operating method thereof according to various embodiments may perform a switch to an input mode for inputting a figure upon receiving a signal relating to a figure for connection authentication, thus enabling a user to easily input a figure for authentication for connection with a first electronic device.

Effects obtainable from the disclosure may not be limited to the above mentioned effects, and other effects which are not mentioned may be clearly understood, through the following descriptions, by those skilled in the art to which the disclosure pertains.

BEST MODE FOR CARRYING OUT THE INVENTION

Figure 1:
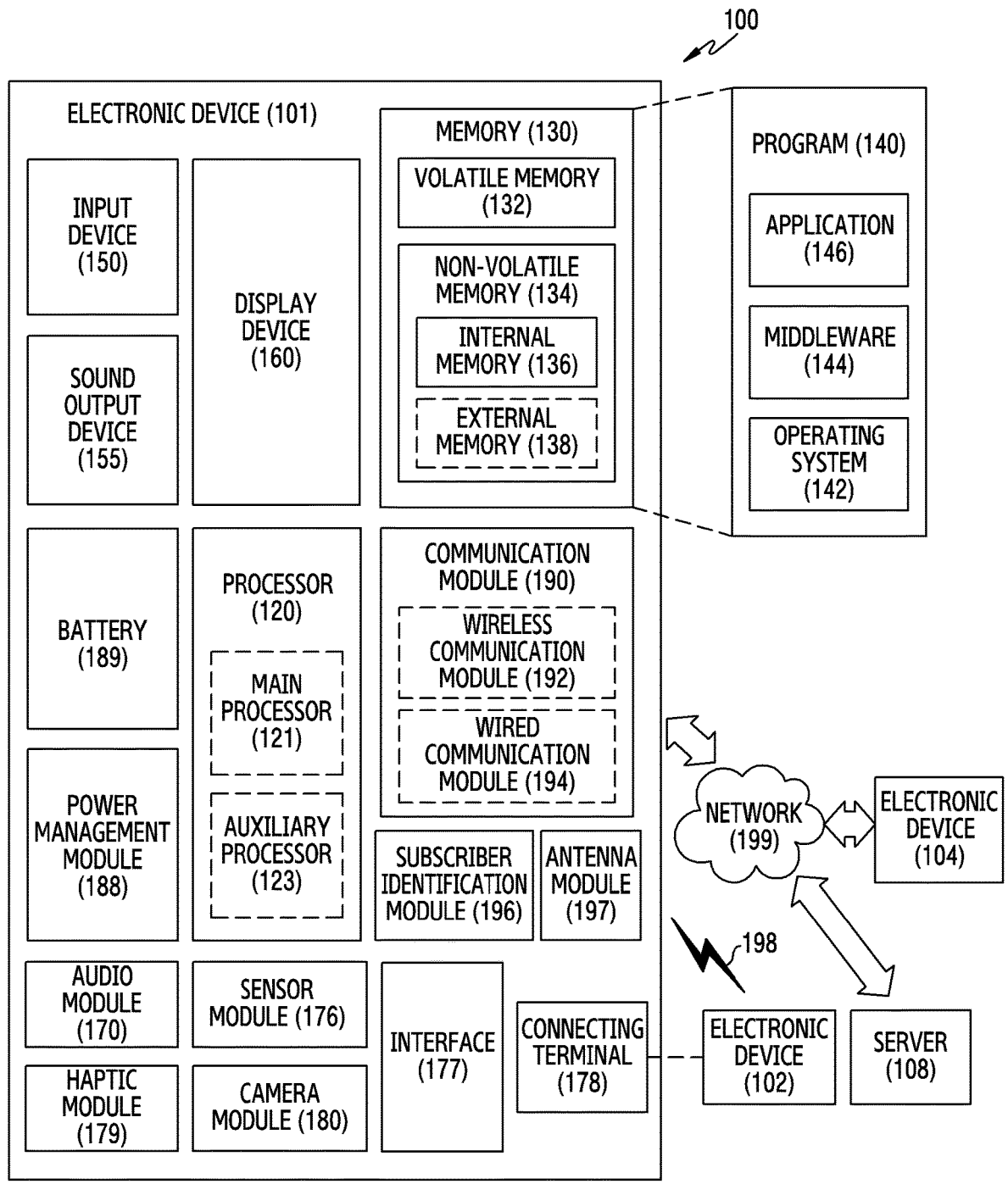
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and at least one antenna appropriate for a communication scheme used in the communication network, such as the first network 198 or the second network 199, may be selected, for example, by the communication module 190 from the one or more antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
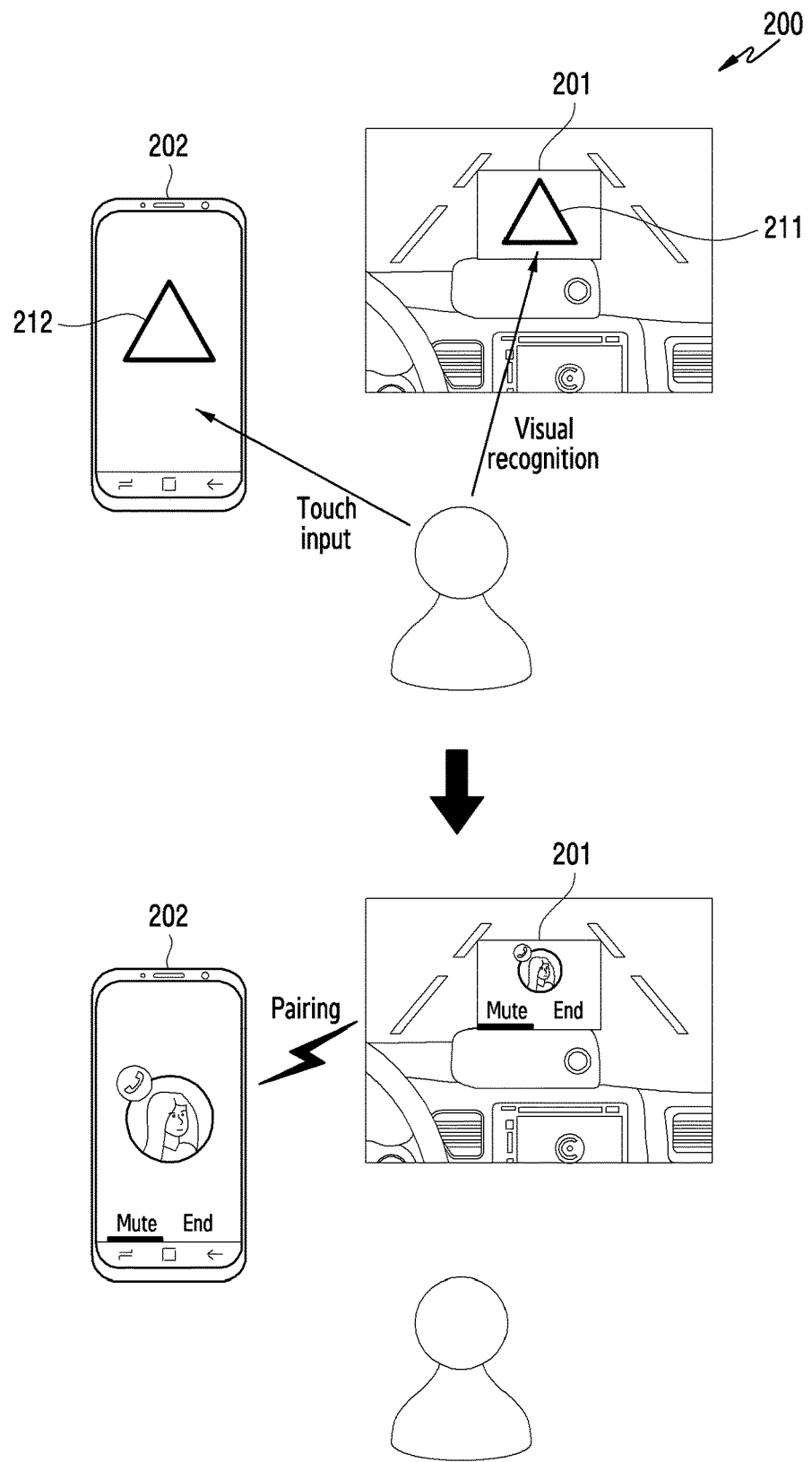
FIG. 2 illustrates an example of connection of a first electronic device to a second electronic device according to various embodiments.

FIG. 2 illustrates an example of connection of a first electronic device to a second electronic device according to various embodiments. In the following description, at least one of the first electronic device 201 or the second electronic device 202 may be the electronic device 101 of FIG. 1.

Referring to FIG. 2, the first electronic device 201 in a network environment 210 may display a first FIG. 211 (e.g., a triangle) for authentication for connection with the second electronic device 202 on a display device (e.g., the display device 160 of FIG. 1) of the first electronic device 201. For example, the first electronic device 201 may display the first FIG. 211 for connection authentication upon receiving a signal for connection from the second electronic device 202. In another example, the first electronic device 201 may display a plurality of first figures 211 corresponding to respective capabilities of the second electronic device 202 on the display device of the first electronic device 201. In one example, the first figures 211 may include a figure that can be drawn with a single stroke.

According to an embodiment, the first electronic device 201 may transmit a signal relating to the first FIG. 211 for authentication for connection with the second electronic device 202 to the second electronic device 202. For example, the signal relating to the first FIG. 211 may include information about the configuration (shape) of the first FIG. 211 or information indicating that the first FIG. 211 is generated.

According to an embodiment, the second electronic device 202 may switch the operating mode of the second electronic device 202 to an input mode upon receiving the signal relating to the first FIG. 211. For example, the second electronic device 202 may display a user interface for inputting a second FIG. 212 (e.g., a triangle) to a display device (e.g., the display device 160 of FIG. 1) of the second electronic device 202.

According to an embodiment, the second electronic device 202 may transmit information about the second FIG. 212 received from a user input to the first electronic device 201 in response to the signal relating to the first FIG. 211. For example, the information about the second FIG. 212 may include the configuration (shape) of the second FIG. 212 or feature points of the second FIG. 212.

According to an embodiment, the first electronic device 201 may perform authentication for connection with the second electronic device 202, based on the information about the second FIG. 212. For example, when a similarity between the first FIG. 211 and the second FIG. 212 is greater than a preset reference value, the first electronic device 201 may establish connection with the second electronic device 202. In another example, when a plurality of first FIG. 211 is displayed on the first electronic device 201, the first electronic device 201 may identify one figure having the highest similarity to the second FIG. 212 among the plurality of first figures 211. The first electronic device 201 may establish connection with the second electronic device 202 in order to perform an operation according to the capability of the second electronic device 202 corresponding to the first figure associated with the second FIG. 212.

According to an embodiment, the second electronic device 202 may identify a similarity between the first FIG. 211 and the second FIG. 212. For example, when the similarity between the first FIG. 211 and the second FIG. 212 is greater than a preset reference value, the second electronic device 202 may transmit a signal for connection permission to the first electronic device 201. In another example, when a plurality of first FIG. 211 is displayed on the first electronic device 201, the second electronic device 202 may identify one figure having the highest similarity to the second FIG. 212 among the plurality of first figures 211. The second electronic device 202 may transmit a signal for connection permission to the first electronic device 201 in order to perform an operation according to the capability of the second electronic device 202 corresponding to the first FIG. 211 associated with the second FIG. 212.

According to an embodiment, the first electronic device 201 may establish connection with the second electronic device 202, based on the signal for connection permission received from the second electronic device 202. For example, when the first electronic device 201 receives the signal for connection permission from the second electronic device 202, the first electronic device 201 may establish connection with the second electronic device 202 in order to perform an operation according to a function of the second electronic device 202 corresponding to the first FIG. 211.

According to an embodiment, the first electronic device 201 may perform some functions of the second electronic device 202, based on the connection between the first electronic device 201 and the second electronic device 202. For example, the first electronic device 201 may be a head-up display. The second electronic device 202 may be a smartphone. When there is an incoming call on the second electronic device 202, the first electronic device 201 may display an incoming call screen so that the call can be received on the first electronic device 201.

According to an embodiment, at least one of the first electronic device 201 or the second electronic device 202 may include at least one of an Internet of Things (IoT) device, a smartphone, a head-up display (HUD), a television, a closed-circuit television (CCTV), or a smart refrigerator. However, the first electronic device 201 and the second electronic device 202 are not limited to the aforementioned examples.

According to various embodiments of the disclosure, a first electronic device 201 may include: a display; a processor configured to be operatively connected to the display; a memory configured to be operatively connected to the processor, wherein the memory may store instructions that, when executed, cause the processor to: generate a first figure for connection authentication of a second electronic device 202; display the first figure on the display; transmit a signal relating to the first figure to the second electronic device 202; identify a second figure included in a response signal when receiving the response signal corresponding to the signal relating to the first figure; determine whether the second electronic device 202 is authenticated, based on a similarity between the first figure and the second figure; and establish connection with the second electronic device 202, based on a determination result.

According to various embodiments, the first figure may include a figure that can be drawn with a single stroke.

According to various embodiments, the instructions may include an instruction that causes the processor of the first electronic device 201 to determine whether the second electronic device 202 is authenticated by comparing the similarity between the first figure and the second figure with a reference value.

According to various embodiments, the instructions may include an instruction that causes the processor of the first electronic device 201 to identify feature points of the first figure and feature points of the second figure and to identify the similarity between the first figure and the second figure, based on the feature points of the first figure and the feature points of the second figure.

According to various embodiments, the feature points may include information about at least one of a point, a line, and an angle.

According to various embodiments, the signal relating to the first figure may include information about the configuration of the first figure.

According to various embodiments, the instructions may include an instruction that causes the processor of the first electronic device 201 to identify a capability of the second electronic device corresponding to the first figure and to establish the connection with the second electronic device 202, based on the capability of the second electronic device 202.

According to various embodiments, the instructions may further include an instruction that causes the processor of the first electronic device 201 to identify group information about the second electronic device 202, based on the first figure corresponding to the second figure when there is a plurality of first figures.

According to various embodiments, the instructions may include an instruction that causes the processor of the first electronic device 201 to transmit the group information to the second electronic device 202.

According to various embodiments of the disclosure, a second electronic device 202 may include: a display; a processor configured to operatively connected to the display; and a memory configured to be operatively connected to the processor, wherein the memory may store instructions that, when executed, cause the processor to: receive a signal relating to a first figure for connection authentication of a first electronic device 201; switch to an input mode, based on the signal; receive an input of a second figure corresponding to the first figure for connection authentication in the input mode; and transmit a signal relating to the input to the first electronic device 201.

According to various embodiments, the first figure for connection authentication may include a figure that can be drawn with a single stroke.

According to various embodiments, the instructions may include an instruction that causes the processor of the second electronic device 202 to identify a similarity between the first figure for connection authentication and the second figure corresponding to the first figure for connection authentication.

Figure 3:
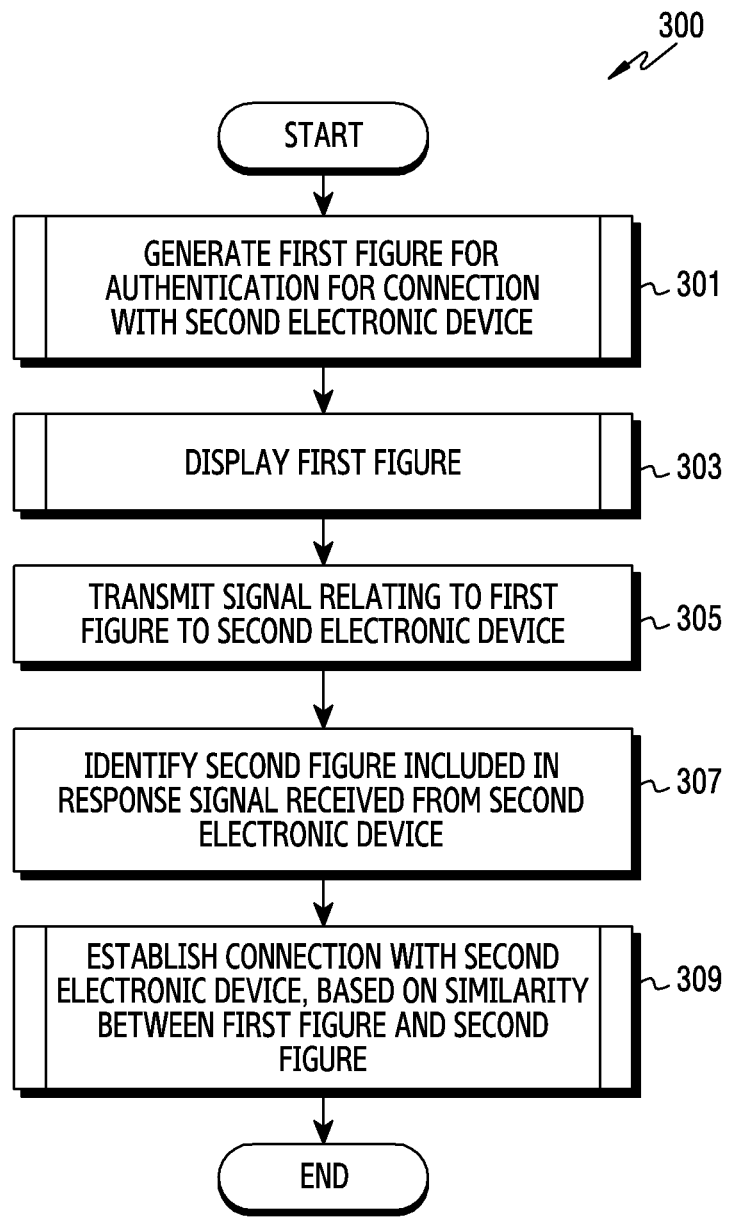
FIG. 3 is a flowchart illustrating the operation of a first electronic device according to various embodiments.

FIG. 3 is a flowchart illustrating the operation of a first electronic device according to various embodiments. The operation (e.g., operation 300) may be performed by the first electronic device 201 or a processor of the first electronic device 201. In the following description, the first electronic device 201 may include the electronic device 101 of FIG. 1 or at least a part (e.g., the processor 120) of the electronic device 101. A first figure may correspond to the first FIG. 211 of FIG. 2. A second figure may correspond to the second FIG. 212 of FIG. 2.

Referring to FIG. 3, in operation 301, the processor (e.g., the processor 120 of FIG. 1) of the first electronic device 201 may generate a first figure for authentication for connection with a second electronic device 202. According to an embodiment, when receiving a signal for a connection request through a communication module (e.g., the communication module 190 of FIG. 1) of the first electronic device 201 from the second electronic device 202, the processor of the first electronic device 201 may generate the first figure for authentication for connection with a second electronic device 202. According to an embodiment, the processor of the first electronic device 201 may receive a user input for connection with the second electronic device 202 through an input device (e.g., the input device 150 of FIG. 1) of the first electronic device 201. When receiving the user input, the processor of the first electronic device 201 may generate the first figure for authentication for connection with the second electronic device 202. For example, the first figure may include a plurality of figures corresponding to respective capabilities of the second electronic device 202. For example, the first figure may be a figure that can be drawn with a single stroke and may include at least one of a circle, an ellipse, a semicircle, a fan shape, or a polygon.

In operation 303, the processor of the first electronic device 201 may control a display device (e.g., the display device 160 of FIG. 1) of the first electronic device 201 to display the first figure. According to an embodiment, the processor of the first electronic device 201 may control the display device of the first electronic device 201 to display information about an operation that can be performed by the second electronic device 202 through the connection along with the first figure. For example, when a plurality of first figures is displayed, the processor of the first electronic device 201 may control the display device of the first electronic device 201 to display information about an operation according to the capability of the second electronic device 202 corresponding to each figure along with the first figures.

In operation 305, the processor of the first electronic device 201 may control the communication module (e.g., the communication module 190 of FIG. 1) of the first electronic device 201 to transmit a signal relating to the first figure to the second electronic device 202. The second electronic device 202 may receive the signal relating to the first figure. For example, the processor of the first electronic device 201 may control the communication module of the first electronic device 201 to broadcast the signal relating to the first figure. For example, the signal relating to the first figure may include information about the configuration (shape) of the first figure. According to an embodiment, the processor of the first electronic device 201 may encode the first figure. The processor of the first electronic device 201 may control the communication module of the first electronic device 201 to transmit the encoded first figure to the second electronic device 202.

In operation 307, the processor of the first electronic device 201 may identify a second figure included in a response signal. For example, the processor of the first electronic device 201 may receive the response signal to the signal relating to the first figure from the second electronic device 202 through the communication module of the first electronic device 201. The response signal may include an encoded second figure. The processor of the first electronic device 201 may decode the second figure. The processor of the first electronic device 201 may identify the second figure included in the response signal through decoding.

In operation 309, the processor of the first electronic device 201 may control the communication module of the first electronic device 201 to establish connection with the second electronic device 202, based on a similarity between the first figure and the second figure. According to an embodiment, the processor of the first electronic device 201 may identify whether the similarity between the first figure and the second figure is greater than a preset reference value. When the similarity is greater than the preset reference value, the processor of the first electronic device 201 may control the communication module of the first electronic device 201 to establish connection with the second electronic device 202. According to an embodiment, the processor of the first electronic device 201 may receive a signal relating to the similarity between the first figure and the second figure from the second electronic device 202 through the communication module of the first electronic device 201. The processor of the first electronic device 201 may control the communication module of the first electronic device 201 to establish connection with the second electronic device, based on the signal related the similarity. For example, when the similarity is greater than the preset reference value, the second electronic device 202 may transmit a signal for connection permission. The processor of the first electronic device 201 may receive the signal for connection permission through the communication module of the first electronic device 201. The first electronic device 201 may control the communication module of the first electronic device 201 to establish connection with the second electronic device, based on the signal for connection permission.

Figure 4:
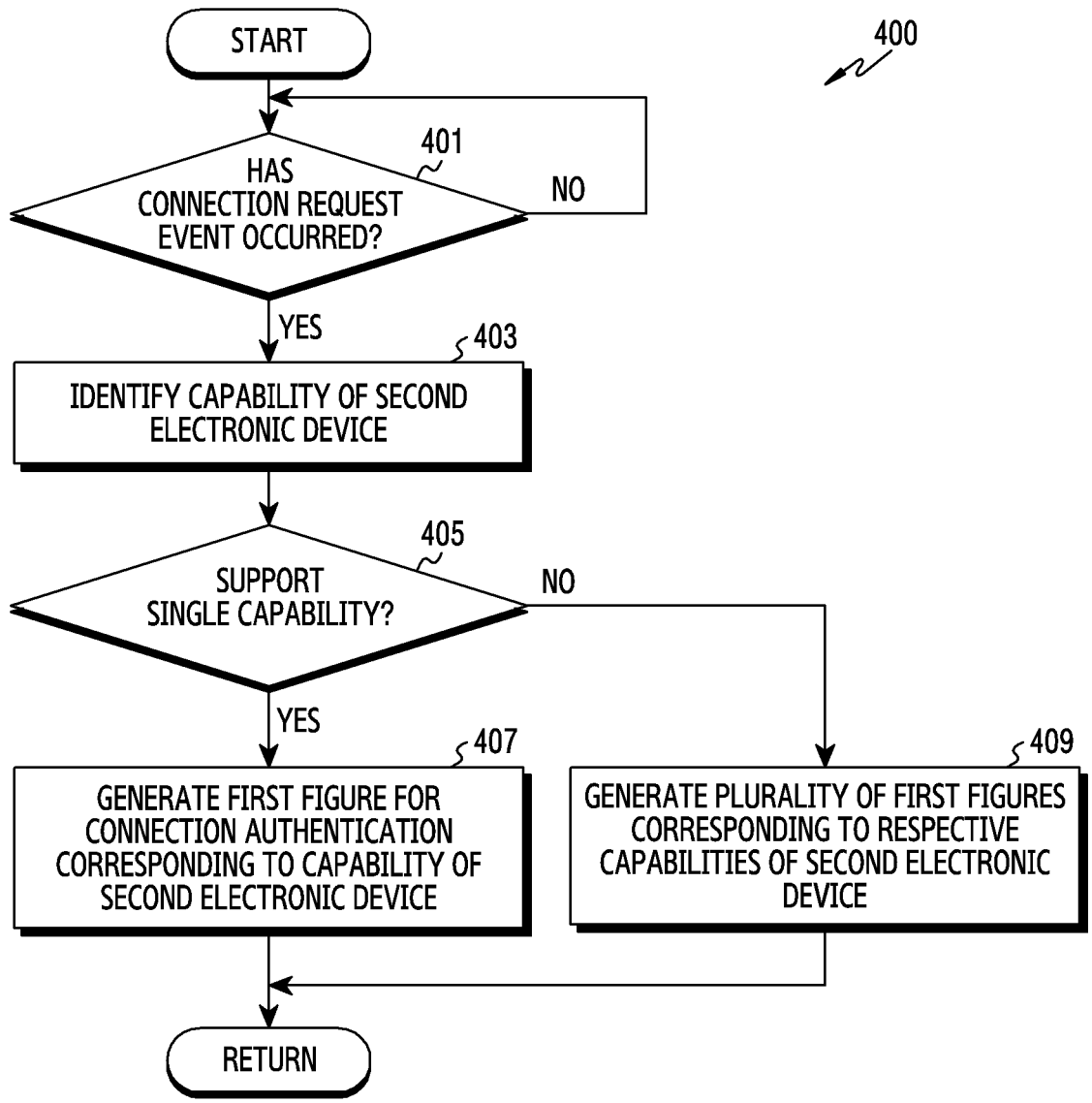
FIG. 4 is a flowchart illustrating an operation of a first electronic device generating a first figure according to various embodiments.

FIG. 4 is a flowchart illustrating an operation of a first electronic device generating a first figure according to various embodiments. The operation 400 of FIG. 4 may be related to operation 301 of FIG. 3. In the following description, the first electronic device 201 may include the electronic device 101 of FIG. 1 or at least a part (e.g., the processor 120) of the electronic device 101. A first figure may correspond to the first FIG. 211 of FIG. 2.

Referring to FIG. 4, in operation 401, a processor (e.g., the processor 120 of FIG. 1) of the first electronic device 201 may identify whether a connection request event has occurred. According to an embodiment, the processor of the first electronic device 201 may identify whether a signal for a connection request has been received through a communication module (e.g., the communication module 190 of FIG. 1) of the first electronic device 201. For example, when a second electronic device 202 broadcasts a signal for a connection request, the processor of the first electronic device 201 may receive the signal for the connection request from the second electronic device 202 through the communication module of the first electronic device 201. The first electronic device 201 may identify that a connection request event has occurred, based on the signal. According to an embodiment, the processor of the first electronic device 201 may receive a user input for connection with the second electronic device 202 through an input device (e.g., the input device 150 of FIG. 1) of the first electronic device 201. The processor of the first electronic device 201 may identify that a connection request event has occurred, based on the user input.

In operation 403, the processor of the first electronic device 201 may identify the capability of the second electronic device 202 when the connection request event has occurred. According to an embodiment, the processor of the first electronic device 201 may identify the capability of the second electronic device 202 through a protocol. For example, the first electronic device 201 may be a television (TV). The second electronic device 202 may be a smartphone. The processor of the first electronic device 201 may establish the connection and may then identify the capability of the second electronic device 202. The processor of the first electronic device 201 may identify that the second electronic device 202 can perform a screen mirroring function and a screen control function through the connection.

In operation 405, the processor of the first electronic device 201 may determine whether the second electronic device 202 has a single capability to be performed through the connection. For example, the first electronic device 201 may be a speaker. The second electronic device 202 may be a smartphone. The processor of the first electronic device 201 may identify that the second electronic device 202 can perform only a sound information transmission function through the connection. The processor of the first electronic device 201 may identify that the second electronic device 202 supports a single capability.

In operation 407, when the second electronic device 202 supports the single capability, the processor of the first electronic device 201 may generate a figure for connection authentication corresponding to the capability of the second electronic device 202. According to an embodiment, the processor of the first electronic device 201 may generate a figure that can be drawn with a single stroke as the figure for connection authentication. For example, the processor of the first electronic device 201 may generate one of a circle, an ellipse, a fan shape, and a polygon as a first figure for connection authentication.

It has been shown above that the processor of the first electronic device 201 may generate one of a circle, an ellipse, a fan shape, and a polygon as the first figure for connection authentication, but the disclosure is not limited thereto. According to various embodiments of the disclosure, the processor of the first electronic device 201 may generate various shapes of figures that can be drawn with a single stroke.

In operation 409, when the second electronic device 202 supports a plurality of capabilities, the processor of the first electronic device 201 may generate a plurality of first figures for connection authentication corresponding to the respective capabilities of the second electronic device. For example, the processor of the first electronic device 201 may identify that the second electronic device 202 can perform the screen mirroring function and the screen control function. The processor of the first electronic device 201 may generate a circle as a figure corresponding to the screen mirroring function. The processor of the first electronic device 201 may generate a triangle as a figure corresponding to the screen control function.

Figure 5A:
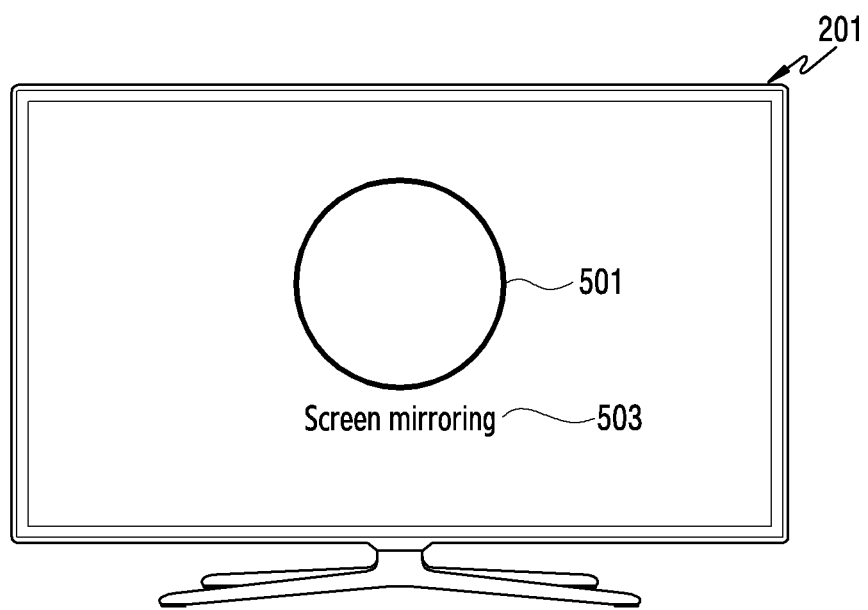
FIG. 5A and FIG. 5B illustrate an example of displaying a first figure on a screen of a first electronic device.

FIG. 5A illustrates an example of displaying a first figure on a screen of a first electronic device. FIG. 5A may be related to operation 303 of FIG. 3. In the following description, the first electronic device 201 may include the electronic device 101 of FIG. 1 or at least a part (e.g., the processor 120) of the electronic device 101. A first figure may correspond to the first FIG. 211 of FIG. 2.

Referring to FIG. 5A, when a second electronic device 202 supports a single capability, a processor (e.g., the processor 120 of FIG. 1) of the first electronic device 201 may control a display device (e.g., the display device 160 of FIG. 1) of the first electronic device 201 to display a first figure for connection authentication corresponding to the capability of the second electronic device 202. For example, the first electronic device 201 may be a TV. The second electronic device 202 may be a smartphone. The processor of the first electronic device 201 may identify that the second electronic device 202 can perform only a screen mirroring function. The processor of the first electronic device 201 may generate a circle 501 that is a figure corresponding to the screen mirroring function. The processor of the first electronic device 201 may control the display device of the first electronic device 201 to display the circle 501. The processor of the first electronic device 201 may control the display device of the first electronic device 201 to display an object 503 indicating information indicating that the screen mirroring function can be performed along with the circle 501. Although it has been shown above that an object indicating information about an operation corresponding to the first figure is displayed under the first figure, the first figure and the object indicating the information about the operation corresponding to the first figure may be displayed by various methods according to various embodiments of the disclosure.

Figure 5B:
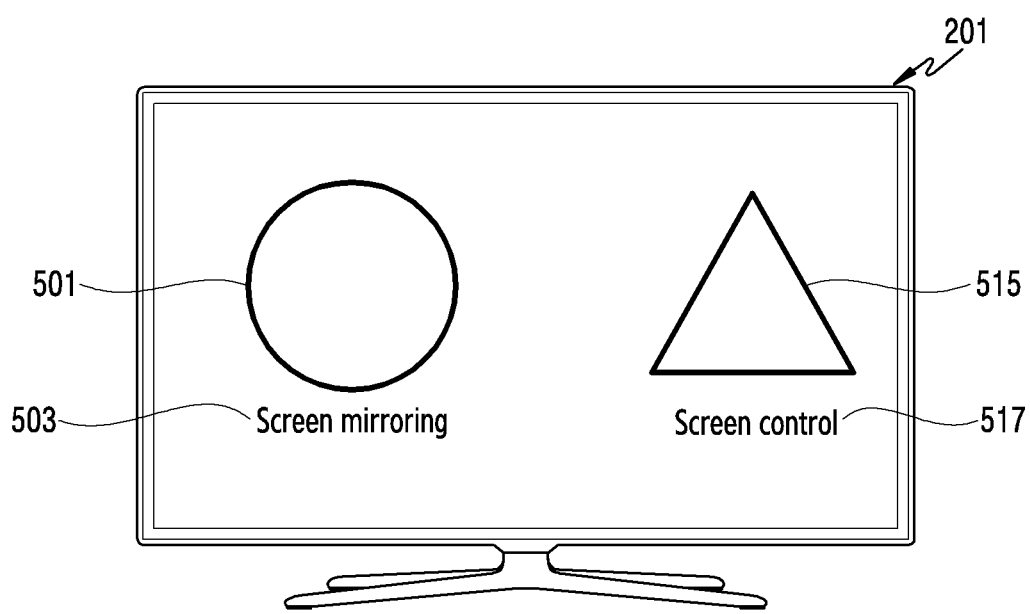

FIG. 5B illustrates an example of displaying a first figure on a screen of a first electronic device. FIG. 5BA may be related to operation 303 of FIG. 3. In the following description, the first electronic device 201 may include the electronic device 101 of FIG. 1 or at least a part (e.g., the processor 120) of the electronic device 101. A first figure may correspond to the first FIG. 211 of FIG. 2.

Referring to FIG. 5B, when a second electronic device 202 supports a plurality of capabilities, a processor of the first electronic device 201 may control a display device (e.g., the display device 160 of FIG. 1) of the first electronic device 201 to display a plurality of first figures for connection authentication corresponding to the capabilities of the second electronic device 202. For example, the first electronic device 201 may be a TV. The second electronic device 202 may be a smartphone. The processor of the first electronic device 201 may identify that the second electronic device 202 can perform a screen mirroring function and a screen control function through connection. The processor of the first electronic device 201 may generate a circle that is a figure corresponding to the screen mirroring function. The processor of the first electronic device 201 may generate a triangle that is a figure corresponding to the screen control function. The processor of the first electronic device 201 may control the display device of the first electronic device 201 to display the circle 501 and the triangle 515. The processor of the first electronic device 201 may control the display device of the first electronic device 201 to display an object 503 indicating information indicating that the screen mirroring function can be performed under the circle 501. The processor of the first electronic device 201 may control the display device of the first electronic device 201 to display an object 517 indicating information indicating that the screen control function can be performed under the triangle 515. Although it has been shown above that an object indicating information about an operation corresponding to a first figure is displayed under the first figure, the first figure and the object indicating the information about the operation corresponding to the first figure may be displayed by various methods according to various embodiments of the disclosure.

Figure 6:
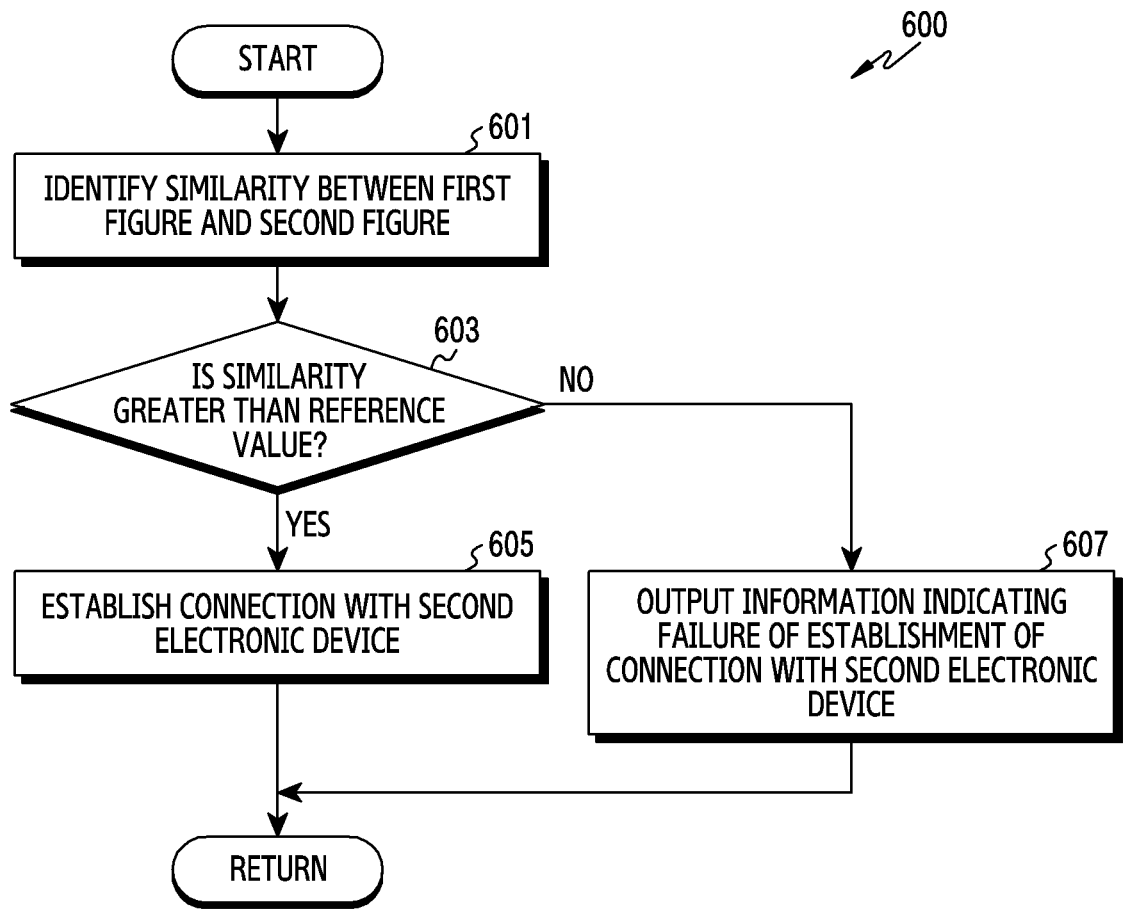
FIG. 6 is a flowchart illustrating an operation of a first electronic device establishing connection with a second electronic device according to various embodiments.

FIG. 6 is a flowchart illustrating an operation of a first electronic device establishing connection with a second electronic device according to various embodiments. The operation 600 of FIG. 6 may be related to operation 309 of FIG. 3. In the following description, the first electronic device 201 may include the electronic device 101 of FIG. 1 or at least a part (e.g., the processor 120) of the electronic device 101. A first figure may correspond to the first FIG. 211 of FIG. 2. A second figure may correspond to the second FIG. 212 of FIG. 2.

Referring to FIG. 6, in operation 601, a processor of the first electronic device 201 may identify a similarity between the first figure and the second figure in order to establish connection of the first electronic device 201 to the second electronic device 202. For example, the processor of the first electronic device 201 may identify feature points of the first figure. The processor of the first electronic device 201 may identify information about a point, a line, and an angle of the first figure, based on the feature points of the first figure. The processor of the first electronic device 201 may identify feature points of the second figure. The processor of the first electronic device 201 may identify information about a point, a line, and an angle of the second figure, based on the feature points of the second figure. The processor of the first electronic device 201 may identify the similarity between the first figure and the second figure, based on the information about the point, the line, and the angle of the first figure and the information about the point, the line, and the angle of the second figure. For example, the processor of the first electronic device 201 may determine the similarity between the first figure and the second figure to be in a range from 0 to 1.

In operation 603, the processor of the first electronic device 201 may determine whether the similarity between the first figure and the second figure is greater than a reference value. For example, the processor of the first electronic device 201 may identify that the similarity (e.g., 0.75) between the first figure and the second figure is the reference value (e.g., 0.8) or less. According to various embodiments, the processor of the first electronic device 201 may change the reference value for similarity.

In operation 605, when the similarity between the first figure and the second figure is greater than the reference value, the processor of the first electronic device 201 may establish connection with the second electronic device 202. For example, when the similarity between the first figure and the second figure is greater than the reference value, the processor of the first electronic device 201 may control a communication module (e.g., the communication module 190 of FIG. 1) of the first electronic device 201 to transmit a connection permission signal to the second electronic device 202. The processor of the first electronic device 201 may establish connection with the second electronic device 202 when receiving a connection acknowledgement signal from the second electronic device 202 through the communication module of the first electronic device 201.

In operation 607, when the similarity between the first figure and the second figure is the reference value or less, the processor of the first electronic device 201 may output information indicating that establishment of the connection with the second electronic device 202 has failed. According to an embodiment, the processor of the first electronic device 201 may control a display device (e.g., the display device 160 of FIG. 1) of the first electronic device 201 to display information indicating the failure of the connection. According to an embodiment, the processor of the first electronic device 201 may transmit a signal relating to the failure of establishment of the connection to the second electronic device 202. The second electronic device 202 may receive the signal relating to the failure of establishment of the connection from the first electronic device 201.

According to various embodiments, operation 600 may also be performed by a processor of the second electronic device 202. When the similarity between the first figure and the second figure is greater than the reference value, the processor of the second electronic device 202 may control a communication module (e.g., the communication module 190 of FIG. 1) of the second electronic device 202 to transmit a connection permission signal to the first electronic device 201. The processor of the second electronic device 202 may establish connection with the first electronic device 201 when receiving a connection acknowledgement signal from the first electronic device 201 through the communication module of the second electronic device 202. When the similarity between the first figure and the second figure is the reference value or less, the processor of the second electronic device 202 may output information indicating that establishment of the connection with the first electronic device 201 has failed. According to an embodiment, the processor of the second electronic device 202 may control a display device (e.g., the display device 160 of FIG. 1) of the second electronic device 202 to display information indicating the failure of the connection. According to an embodiment, the processor of the second electronic device 202 may transmit a signal relating to the failure of establishment of the connection to the first electronic device 201. The first electronic device 201 may receive the signal relating to the failure of establishment of the connection from the second electronic device 202.

Figure 7:
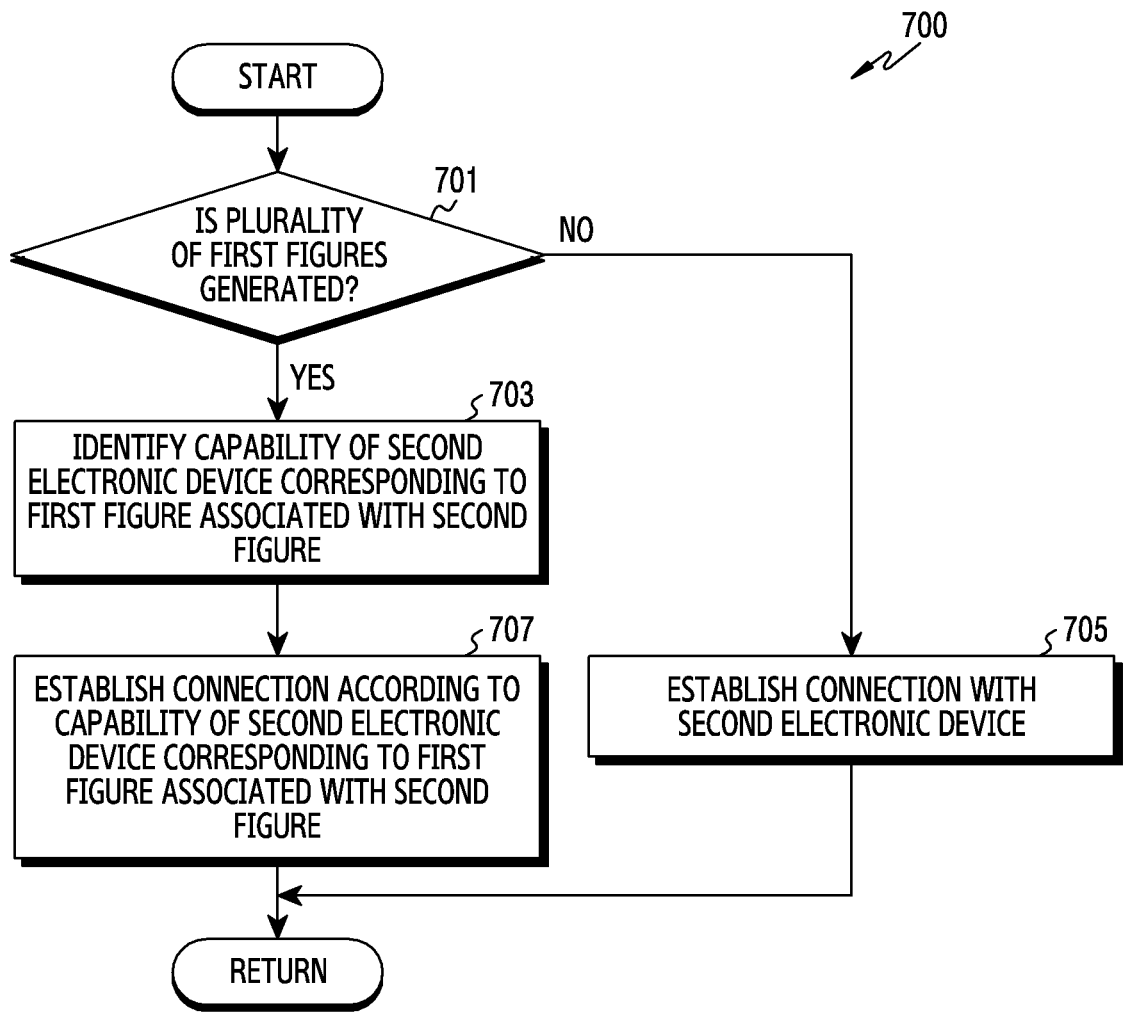
FIG. 7 is another flowchart illustrating an operation of a first electronic device establishing connection with a second electronic device according to various embodiments.

FIG. 7 is a flowchart illustrating an operation of a first electronic device establishing connection with a second electronic device according to various embodiments. The operation 700 of FIG. 7 may be related to operation 605 of FIG. 6. In the following description, the first electronic device 201 may include the electronic device 101 of FIG. 1 or at least a part (e.g., the processor 120) of the electronic device 101. A first figure may correspond to the first FIG. 211 of FIG. 2.

Referring to FIG. 7, in operation 701, a processor (e.g., the processor 120 of FIG. 1) of the first electronic device 201 may determine whether a plurality of first figures is generated in order to identify whether the second electronic device 202 can perform a plurality of operations through connection. According to an embodiment, the processor of the first electronic device 201 may determine whether a plurality of first figures corresponding to capabilities of the second electronic device 202 is generated. For example, the processor of the first electronic device 201 may generate a circle (e.g., the circle 501 of FIG. 5A) as a figure corresponding to a screen mirroring function. The processor of the first electronic device 201 may generate a triangle (e.g., the triangle 515 of FIG. 5B) as a figure corresponding to a screen control function. The processor of the first electronic device 201 may identify that two first figures corresponding to the capabilities of the second electronic device 202 have been generated. The processor of the first electronic device 201 may identify that a plurality of first figures has been generated.

In operation 703, when a plurality of first figures is generated, the processor of the first electronic device 201 may identify the capabilities of the second electronic device 202 corresponding to the first figures. According to an embodiment, the processor of the first electronic device 201 may identify one of a plurality of first figures having the highest similarity to a second figure among the plurality of first figures. The processor of the first electronic device 201 may identify the capability of the second electronic device 202 corresponding to a first figure associated with the second figure. For example, the processor of the first electronic device 201 may generate a circle as a figure corresponding to a screen mirroring function. The processor of the first electronic device 201 may generate a triangle as a figure corresponding to a screen control function. When receiving a second figure having a circular shape, the processor of the first electronic device 201 may identify that a figure having the highest similarity to the second figure among the plurality of first figures is a circle. The processor of the first electronic device 201 may identify that the capability of the second electronic device 202 corresponding to the first figure (e.g., the circle) associated with the second figure (e.g., the circle shape) is the screen mirroring function.

In operation 705, when a plurality of figures is not generated, the processor of the first electronic device 201 may control a communication module (e.g., the communication module 190 of FIG. 1) of the first electronic device 201 to establish connection with the second electronic device 202. For example, when only one circle is generated as a figure corresponding to the screen mirroring function, the processor of the first electronic device 201 may establish connection with the second electronic device 202 to perform the screen mirroring function. According to an embodiment, the processor of the first electronic device 201 may control the communication module of the first electronic device 201 to transmit a signal for establishing connection with the second electronic device 202 to the second electronic device 202. The second electronic device 202 may receive the signal for establishing the connection from the first electronic device 201. The processor of the first electronic device 201 may establish connection with the second electronic device 202 when receiving a connection acknowledgement signal from the second electronic device 202.

In operation 707, the processor of the first electronic device 201 may control the communication module of the first electronic device 201 to establish the connection according to the capability of the second electronic device 202 corresponding to the first figure associated with the second figure. For example, when the capability of the second electronic device 202 corresponding to the first figure associated with the second figure is the screen mirroring function, the processor of the first electronic device 201 may control the communication module of the first electronic device 201 to establish the connection to perform the screen mirroring function. According to one embodiment, the processor of the first electronic device 201 may control the communication module of the first electronic device 201 to transmit a signal for establishing connection with the second electronic device 202 to the second electronic device 202. The second electronic device 202 may receive the signal for establishing the connection from the first electronic device 201. The processor of the first electronic device 201 may establish connection with the second electronic device 202 when receiving a connection acknowledgement signal from the second electronic device 202.

Figure 8:
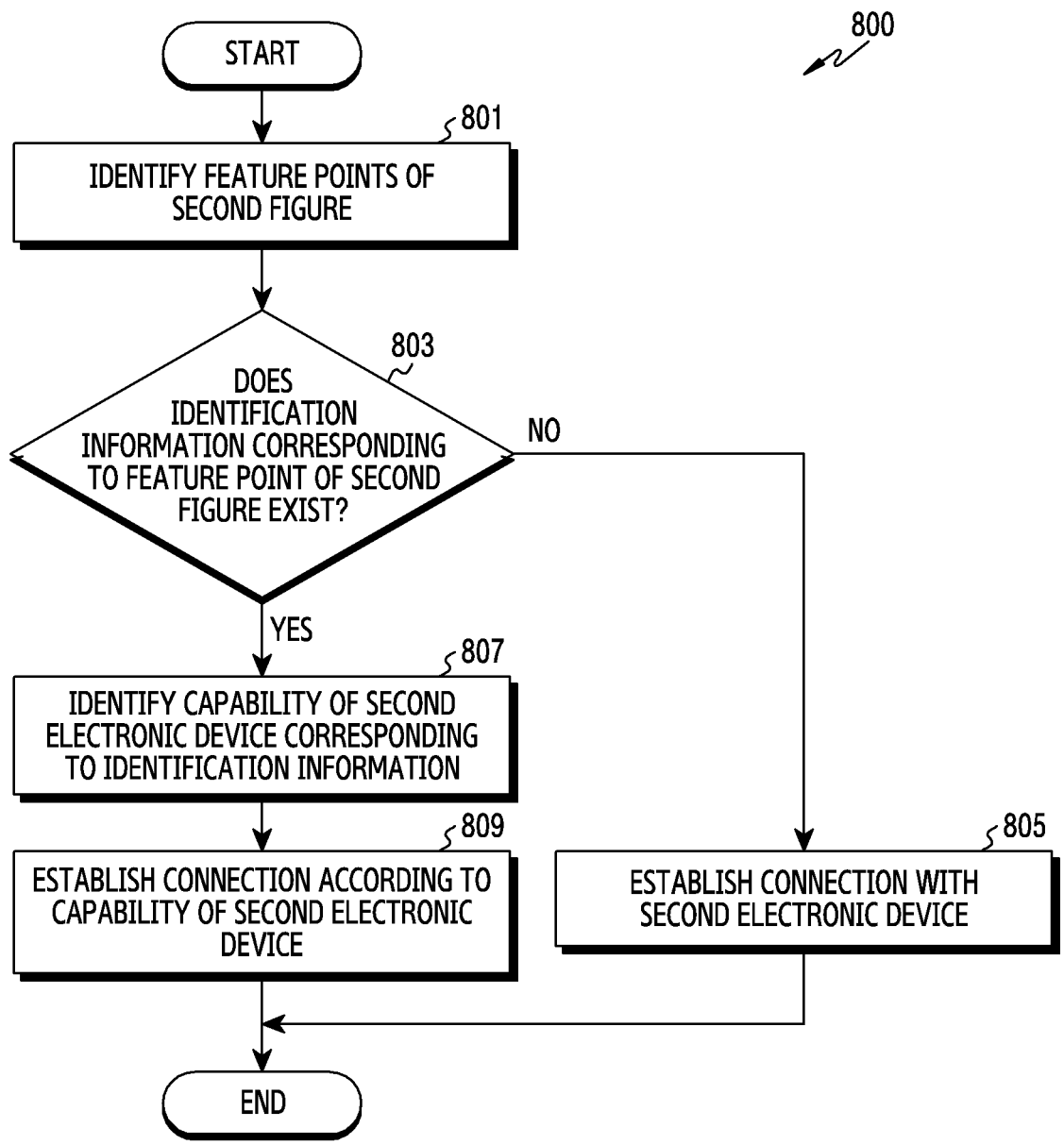
FIG. 8 is a flowchart illustrating an operation of a first electronic device establishing connection with a second electronic device according to various embodiments.

FIG. 8 is a flowchart illustrating an operation of a first electronic device establishing connection with a second electronic device according to various embodiments. The operation 800 of FIG. 8 may be related to operation 605 of FIG. 6. In the following description, the first electronic device 201 may include the electronic device 101 of FIG. 1 or at least a part (e.g., the processor 120) of the electronic device 101. A first figure may correspond to the first FIG. 211 of FIG. 2. A second figure may correspond to the second FIG. 212 of FIG. 2.

Referring to FIG. 8, in operation 801, a processor of the first electronic device 201 may identify feature points of a second figure. The processor of the first electronic device 201 may identify information about a point, a line, and an angle of the second figure, based on the feature points of the second figure. For example, the second figure may be a triangular shape. The processor of the first electronic device 201 may identify information about the number of points of the second figure, the length of a line between points of the second figure, and an angle of the second figure. The processor of the first electronic device 201 may store identification information corresponding to the feature points of the second figure in a memory (e.g., the memory 130 of FIG. 1) of the first electronic device 201. The identification information may include information about a connection history.

In operation 803, the processor of the first electronic device 201 may identify whether there is identification information corresponding to the feature points of the second figure. For example, when the second figure is a triangle, the feature points of the second figure may include three points, lines having lengths of 3 cm, 4 cm, and 5 cm, and angles of 30 degrees, 60 degrees, and 90 degrees. The processor of the first electronic device 201 may identify whether there is a connection history corresponding to a figure having the feature points of the second figure. According to an embodiment, the processor of the first electronic device 201 may identify whether there is a history of connection with the second electronic device 202 through a figure having feature points similar to those of the second figure.

In operation 805, when there is no identification information corresponding to the feature points of the second figure, the processor of the first electronic device 201 may control a communication module (e.g., the communication module 190 of FIG. 1) of the first electronic device 201 to establish connection with the second electronic device 202. For example, the processor of the first electronic device 201 may control the communication module of the first electronic device 201 to transmit a connection permission signal to the second electronic device 202. The second electronic device 202 may receive the connection permission signal from the first electronic device 201. The processor of the first electronic device 201 may establish connection with the second electronic device 202 when receiving a connection acknowledgement signal from the second electronic device 202 through the communication module of the first electronic device 201.

In operation 807, the processor of the first electronic device 201 may identify the capability of the second electronic device 202 corresponding to the identification information. For example, when the second figure is a triangle, the feature points of the second figure may include three points, lines having lengths of 3 cm, 4 cm, and 5 cm, and angles of 30 degrees, 60 degrees, and 90 degrees. The processor of the first electronic device 201 may identify a history of performing a screen control operation through the figure having the feature points of the second figure. When there is a history of performing the screen control operation through the figure having the feature points of the second figure, the processor of the first electronic device 201 may identify that a user has performed the screen control operation after establishing connection with the second electronic device 202. The processor of the first electronic device 201 may identify that the capability of the second electronic device 202 corresponds to screen control based on the user having performed the screen control operation through the second electronic device 202.

In operation 809, the processor of the first electronic device 201 may establish the connection through the communication module of the first electronic device 201 according to the capability of the second electronic device 202. For example, the processor of the first electronic device 201 may establish connection with the second electronic device 202 to perform a screen mirroring operation through the communication module of the first electronic device 201. The processor of the first electronic device 201 may control the communication module of the first electronic device 201 to transmit a connection permission signal to the second electronic device 202. The second electronic device 202 may receive the connection permission signal from the first electronic device 201. The processor of the first electronic device 201 may establish connection with the second electronic device 202 when receiving a connection acknowledgement signal from the second electronic device 202 through the communication module of the first electronic device 201.

Figure 9:
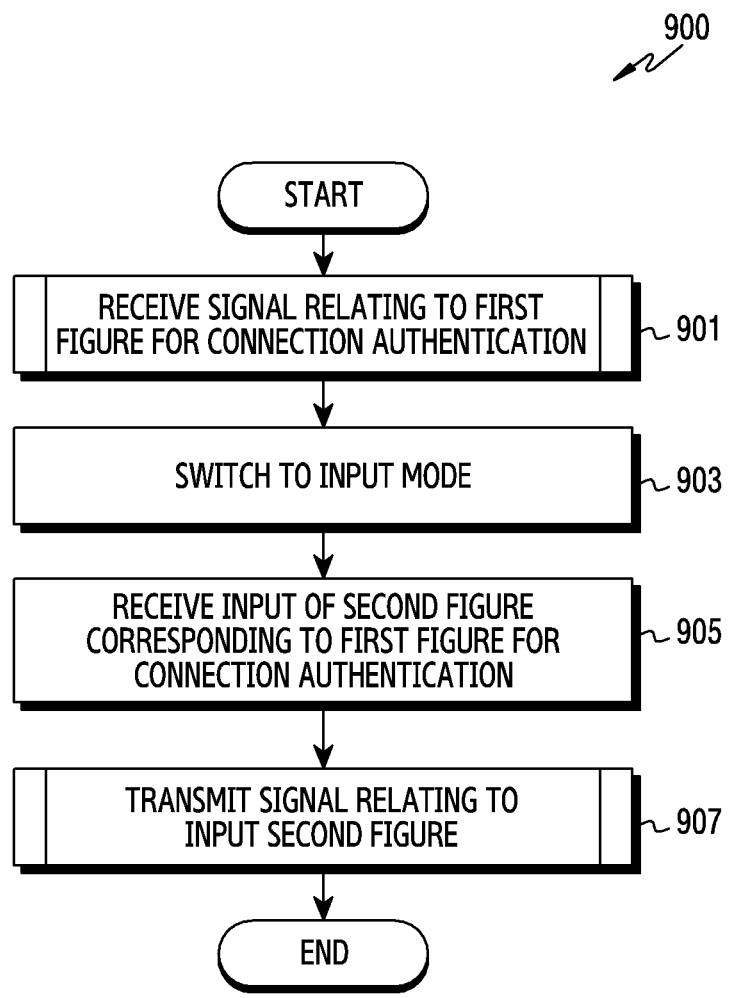
FIG. 9 is a flowchart illustrating an operation of a second electronic device transmitting a second figure for connection authentication according to various embodiments.

FIG. 9 is a flowchart illustrating an operation of a second electronic device transmitting a second figure for connection authentication according to various embodiments.

Figure 10:
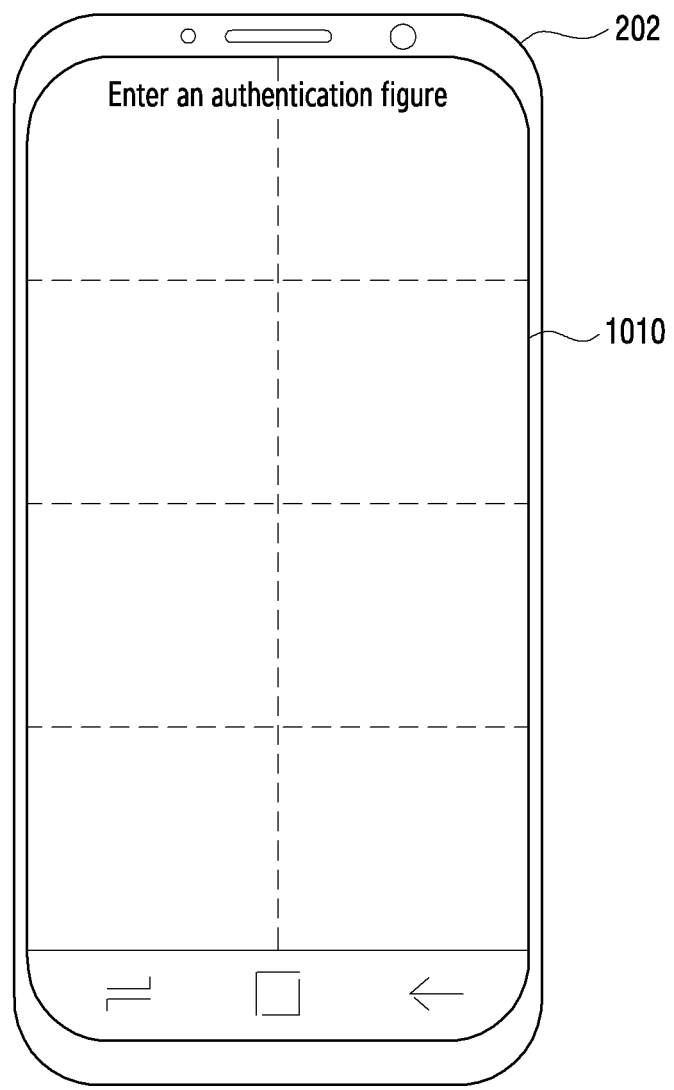
FIG. 10 illustrates an example in which a second electronic device receives an input of a second figure according to various embodiments.

FIG. 10 illustrates an example in which a second electronic device receives an input of a second figure according to various embodiments.

The operation (e.g., operation 900) may be performed by the second electronic device 202 or a processor of the second electronic device 202. In the following description, the second electronic device 202 may include the electronic device 101 of FIG. 1 or at least a part (e.g., the processor 120) of the electronic device 101. A first figure may correspond to the first FIG. 211 of FIG. 2. A second figure may correspond to the second FIG. 212 of FIG. 2.

Referring to FIG. 9, in operation 901, the processor of the second electronic device 202 (e.g., the processor 120 of the electronic device 101 of FIG. 1) may control a communication module (e.g., the communication module 190 of FIG. 1) of the second electronic device 202 to receive a signal relating to a first figure for connection authentication from a first electronic device 201. For example, the first electronic device 201 may broadcast the signal relating to the first figure for connection authentication. The processor of the second electronic device 202 may receive the signal relating to the first figure for connection authentication from the first electronic device through the communication module of the second electronic device 202.

In operation 903, the processor of the second electronic device 202 may switch the second electronic device 202 to an input mode upon receiving the signal for connection authentication. For example, the processor of the second electronic device 202 may control a display device (e.g., the display device 160 of FIG. 1) of the second electronic device 202 to display a user interface for receiving an input of the second figure corresponding to the first figure for connection authentication from a user. According to an embodiment, the processor of the second electronic device 202 may output an announcement "Enter an authentication figure" through a sound output device (e.g., the sound output device 155 of FIG. 1) of the second electronic device 202. According to an embodiment, the processor of the second electronic device 202 may control the display device of the second electronic device 202 to also display a phrase "Please input an authentication figure" on a screen for receiving an input of the second figure. Referring to FIG. 10, the processor of the second electronic device 202 may control the display device of the second electronic device 202 to display a user interface 1010 for inputting the second figure.

In operation 905, the processor of the second electronic device 202 may receive an input of the second figure corresponding to the first figure for connection authentication from the user through an input device (e.g., the input device 150 of FIG. 1) of the second electronic device 202. For example, the processor of the second electronic device 202 may receive an input of a triangle from the user through the input device of the second electronic device 202. The processor of the second electronic device 202 may identify the feature points of the received triangle. According to an embodiment, the processor of the second electronic device 202 may store at least one of the triangle or the feature points of the triangle in a memory (e.g., the memory 130 of FIG. 1) of the second electronic device 202.

In operation 907, the processor of the second electronic device 202 may control the communication module of the second electronic device 202 to transmit a signal relating to the input second figure. According to an embodiment, the processor of the second electronic device 202 may control the communication module of the second electronic device 202 to transmit a signal including the input second figure to the first electronic device 201. According to an embodiment, the processor of the second electronic device 202 may control the communication module of the second electronic device 202 to transmit a signal relating to connection permission or a signal relating to connection failure to the first electronic device 201, based on a similarity between the figure for connection authentication and the input figure. The first electronic device 201 may receive the signal relating to connection permission or the signal relating to connection failure from the second electronic device 202.

Figure 11:
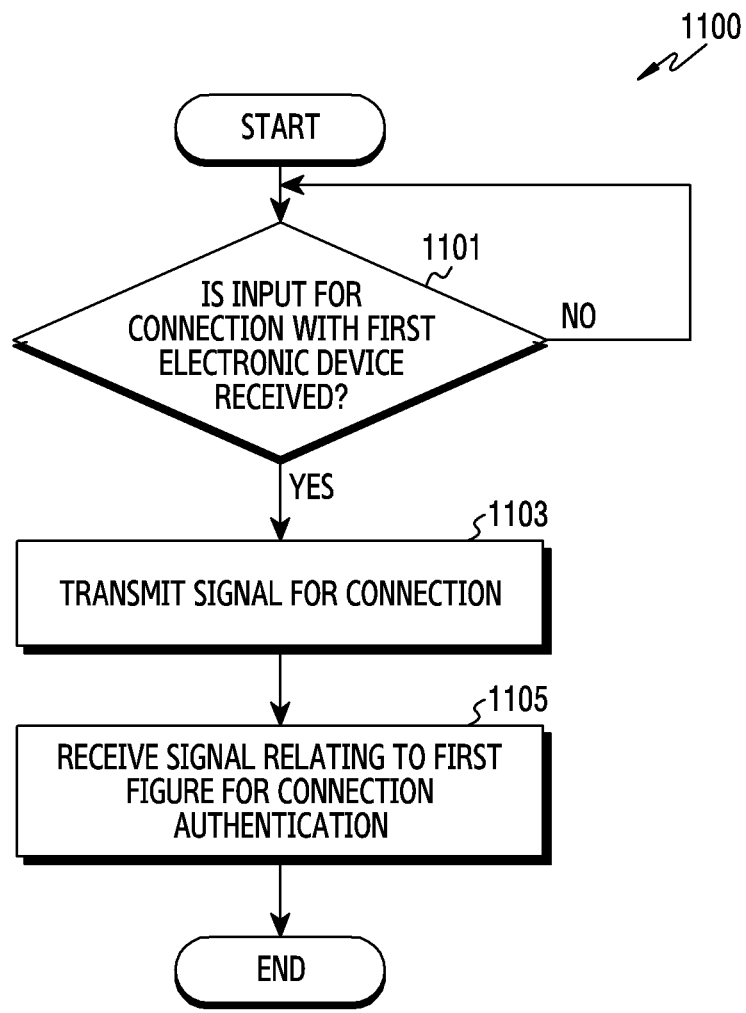
FIG. 11 is a flowchart illustrating an operation of a second electronic device receiving a signal relating to a first figure for connection authentication according to various embodiments.

FIG. 11 illustrates an example of an operation of a second electronic device receiving a signal relating to a first figure for connection authentication according to various embodiments. Operation 1100 of FIG. 11 may be related to operation 901 of FIG. 9. In the following description, the second electronic device 202 may include the electronic device 101 of FIG. 1 or at least a part (e.g., the processor 120) of the electronic device 101. A first figure may correspond to the first FIG. 211 of FIG. 2.

Referring to FIG. 11, in operation 1101, a processor (e.g., the processor 120 of FIG. 1) of the second electronic device 202 may determine whether an input for connection with a first electronic device 201 is received from a user through an input device (e.g., the input device 150 of FIG. 1) of the second electronic device 202. For example, when a tap input is received three times successively, the processor of the second electronic device 202 may identify that an input for connection with the first electronic device 201 is received. In another example, when an application for connection with the first electronic device 201 is executed, the processor of the second electronic device 202 may identify that an input for connection with the first electronic device 201 is received.

In operation 1103, the processor of the second electronic device 202 may control a communication module (e.g., the communication module 190 of the electronic device 101 of FIG. 1) of the second electronic device 202 to transmit a signal for connection to the first electronic device 201. According to an embodiment, the processor of the second electronic device 202 may control the communication module of the second electronic device 202 to broadcast the signal for connection. For example, the processor of the second electronic device 202 may control the communication module of the second electronic device 202 to broadcast a start signal for establishing a Bluetooth connection.

In operation 1105, the processor of the second electronic device 202 may receive a signal relating to a first figure for connection authentication from the first electronic device 201 through the communication module of the second electronic device 202. For example, the first electronic device 201 may generate the first figure for connection authentication upon receiving the signal for connection. The first electronic device 201 may encode the first figure for connection authentication. The first electronic device 201 may transmit encoded information to the second electronic device 202. The processor of the second electronic device 202 may receive the encoded information from the first electronic device 201 through the communication module of the second electronic device 202. The processor of the second electronic device 202 may decode the encoded information.

Figure 12:
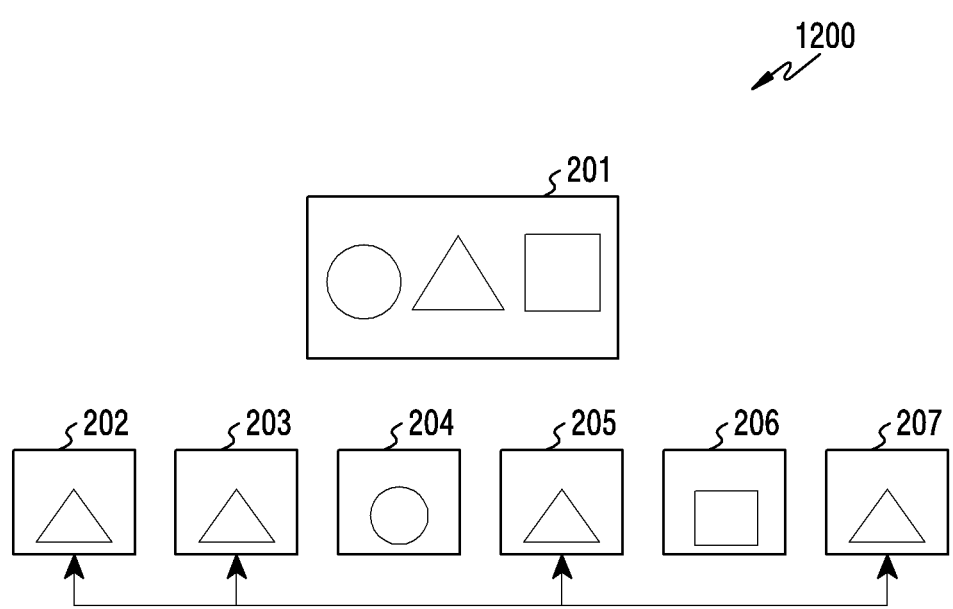
FIG. 12 illustrates an example in which a first electronic device groups and connects a plurality of electronic devices according to various embodiments.

FIG. 12 illustrates an example in which a first electronic device groups and connects a plurality of electronic devices according to various embodiments. In the following description, the first electronic device 201 may include the electronic device 101 of FIG. 1 or at least a part (e.g., the processor 120) of the electronic device 101. A first figure may correspond to the first FIG. 211 of FIG. 2. A second figure may correspond to the second FIG. 212 of FIG. 2.

Referring to FIG. 12, a second electronic device 202 to a seventh electronic device 207 in a network environment 1200 may receive a signal for grouping the second electronic device 202 to the seventh electronic device 207 from the first electronic device 201. The second electronic device 202 to the seventh electronic device 207 may have a functional configuration that is identical or similar to that of the electronic device 101 of FIG. 1 or is different from that of the electronic device 101 of FIG. 1.

According to an embodiment, the first electronic device 201 (e.g., a processor of the first electronic device 201) may generate a plurality of first figures corresponding to a plurality of groups to configure groups of the second electronic device 202 to the seventh electronic device 207. The first electronic device 201 may display the plurality of first figures corresponding to the plurality of groups. For example, the first electronic device 201 may generate a circle corresponding to a first group, a triangle corresponding to a second group, and a rectangle corresponding to a third group in order to classify the second electronic device 202 to the seventh electronic device 207 into three groups and connect thereto. The first electronic device 201 may display a plurality of first figures corresponding to the respective groups. According to an embodiment, the first electronic device 201 may display information about the groups represented by the respective first figures together with the first figures corresponding to the respective groups.

According to an embodiment, the first electronic device 201 may broadcast a signal relating to the first figures corresponding to the respective groups. For example, the first electronic device 201 may encode and transmit the first figures corresponding to the respective groups. The second electronic device 202 to the seventh electronic device 207 may receive the signal relating to the first figures corresponding to the respective groups from the first electronic device 201. When receiving the signal relating to the first figures corresponding to the respective groups, the second electronic device 202 to the seventh electronic device 207 may switch the second electronic device 202 to the seventh electronic device 207 to an input mode. The second electronic device 202 to the seventh electronic device 207 may display a user interface for receiving an input of a second figure in response to the received signal relating to the first figures.

According to an embodiment, the second electronic device 202 to the seventh electronic device 207 may receive an input of a second figure for connection authentication from a user. For example, the second electronic device 202, the third electronic device 203, the fifth electronic device 205, and the seventh electronic device 207 may receive an input of a triangle. The fourth electronic device 204 may receive an input of a circle. The sixth electronic device 206 may receive an input of a rectangle. According to an embodiment, each of the second electronic device 202 to the seventh electronic device 207 may encode the input of the second figure and may transmit the same to the first electronic device 201. The first electronic device 201 may receive the encoded input of the second figure from each of the second electronic device 202 to the seventh electronic device 207.

According to an embodiment, the first electronic device 201 may decode the encoded second figure received from the second electronic device 202 to the seventh electronic device 207. The first electronic device 201 may identify a similarity between the decoded second figures and the first figures corresponding to the respective groups. The first electronic device 201 may determine a group for the second electronic device 202 to the seventh electronic device 207, based on the similarity. For example, the first electronic device 201 may determine the fourth electronic device 204 as a first group, based on that the second figure received from the fourth electronic device 204 has the highest similarity to the circle corresponding to the first group. The first electronic device 201 may determine the second electronic device 202, the third electronic device 203, the fifth electronic device 205, and the seventh electronic device 207 as a second group, based on that the second figures received from the second electronic device 202, the third electronic device 203, the fifth electronic device 205, and the seventh electronic device 207 have the highest similarity to the triangle corresponding to the second group. The first electronic device 201 may determine the fourth electronic device 204 as a third group, based on that the second figure received from the sixth electronic device 206 has the highest similarity to the rectangle corresponding to the third group.

According to an embodiment, the first electronic device 201 may transmit information about a group of each electronic device to the second electronic device 202 to the seventh electronic device 207. For example, the first electronic device 201 may broadcast the information about the group. The information about the group of each electronic device may include information about a group to which the second electronic device 202 to the seventh electronic device 207 belong. The second electronic device 202 to the seventh electronic device 207 may receive the information about the group of each electronic device from the first electronic device 201.

According to an embodiment, the first electronic device 201 may transmit a signal for controlling electronic devices in the same group to connect to each other. For example, the first electronic device 201 may transmit a signal for controlling the second electronic device 202, the third electronic device 203, the fifth electronic device 205, and the seventh electronic device 207, which are determined as the second group, to connect to each other. In another example, the first electronic device 201 may transmit a signal for controlling the second electronic device 202, the third electronic device 203, the fifth electronic device 205, and the seventh electronic device 207, which are determined as the second group, to be multi-paired. The second electronic device 202, the third electronic device 203, the fifth electronic device 205, and the seventh electronic device 207 may be multi-paired to operate.

According to various embodiments of the disclosure, an operating method of a first electronic device 201 may include: generating a first figure for connection authentication of a second electronic device 202; displaying the first figure on a display; transmitting a signal relating to the first figure to the second electronic device 202; identifying a second figure included in a response signal when receiving the response signal corresponding to the signal relating to the first figure; determining whether the second electronic device 202 is authenticated, based on a similarity between the first figure and the second figure; and establishing connection with the second electronic device 202, based on a determination result.

According to various embodiments, the first figure may include a figure that can be drawn with a single stroke.

According to various embodiments, the determining whether the second electronic device 202 is authenticated, based on the similarity between the first figure and the second figure may include determining whether the second electronic device 202 is authenticated by comparing the similarity between the first figure and the second figure with a reference value.

According to various embodiments, the determining whether the second electronic device 202 is authenticated, based on the similarity between the first figure and the second figure may include identifying feature points of the first figure and feature points of the second figure and identifying the similarity between the first figure and the second figure, based on the feature points of the first figure and the feature points of the second figure.

According to various embodiments, the feature points may include information about at least one of a point, a line, and an angle.

According to various embodiments, the establishing of the connection with the second electronic device 202 may include identifying a capability of the second electronic device 202 corresponding to the first figure and establishing the connection with the second electronic device 202, based on the capability of the second electronic device 202.

According to various embodiments, the method may further include identifying group information about the second electronic device 202, based on the first figure corresponding to the second figure when there is a plurality of first figures.

According to various embodiments, the method may further include transmitting the group information to the second electronic device 202.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. An electronic device comprising:
a display;
a processor configured to be operatively connected to the display;
a memory configured to be operatively connected to the processor,
wherein the memory stores instructions that, when executed, cause the processor to:
generate a plurality of first figures corresponding to respective capabilities of an external electronic device;
display the plurality of first figures on the display;
transmit a signal related to the plurality of first figures to the external electronic device;
in response to receiving a response signal corresponding to the signal, identify a second figure included in the response signal;
identify a first figure having the highest similarity to the second figure among the plurality of first figures;
identify a capability of the external electronic device corresponding to the first figure among the capabilities of the external electronic device, the capability including a screen mirroring function and a screen control function; and
establish connection with the external electronic device according to the capability of the external electronic device,
wherein the signal related to the plurality of first figures includes information about a configuration of the respective first figures.

2. The electronic device as claimed in claim 1, wherein the plurality of first figures comprises a figure that can be drawn with a single stroke.

3. The electronic device as claimed in claim 1, wherein the instructions comprise an instruction that causes the processor to compare the similarity between the respective first figures and the second figure with a reference value.

4. The electronic device as claimed in claim 1, wherein the instructions comprise an instruction that causes the processor to identify feature points of the respective first figures and feature points of the second figure and to identify the similarity between the respective first figures and the second figure, based on the feature points of the respective first figures and the feature points of the second figure.

5. The electronic device as claimed in claim 4, wherein the feature points of the respective first figures and the feature points of the second figure include information about the at least one of a point, a line, and an angle.

6. The electronic device as claimed in claim 1, wherein the plurality of first figures comprises a figure that can be drawn with a single stroke.

7. A method of an electronic device, the method comprising:
generating a plurality of first figures corresponding to respective capabilities of an external electronic device;
displaying the plurality of first figures on a display of the electronic device;
transmitting a signal related to the plurality of first figures to the external electronic device;
in response to receiving a response signal corresponding to the signal, identifying a second figure included in the response signal;
identifying a first figure having the highest similarity to the second figure among the plurality of first figures;
identifying a capability of the external electronic device corresponding to the first figure among the capabilities of the external electronic device, the capability including a screen mirroring function and a screen control function; and
establishing connection with the external electronic device according to the capability of the external electronic device,
wherein the signal related to the plurality of first figures includes information about a configuration of the respective first figures.

8. The method as claimed in claim 7, wherein the identifying the first figure comprises comparing the similarity between the respective first figures and the second figure with a reference value.

9. The method as claimed in claim 7, wherein the identifying the first figure comprises identifying feature points of the respective first figures and feature points of the second figure and identifying the similarity between the respective first figures and the second figure, based on the feature points of the respective first figures and the feature points of the second figure.

10. The method as claimed in claim 9, wherein the feature points of the respective first figures and the feature points of the second figure comprise information about at least one of a point, a line, and an angle.

11. The method as claimed in claim 7, wherein the plurality of first figures comprises a figure that can be drawn with a single stroke.

12. A non-transitory computer readable medium storing one or more programs comprising instructions which, when executed by an electronic device having a processor, cause the device to execute:
  generate a plurality of first figures corresponding to respective capabilities of an external electronic device;
  display the plurality of first figures on a display;
  transmit a signal related to the plurality of first figures to the external electronic device;
  in response to receiving a response signal corresponding to the signal, identify a second figure included in the response signal;
  identify a first figure having the highest similarity to the second figure among the plurality of first figures;
  identify a capability of the external electronic device corresponding to the first figure among the capabilities of the external electronic device, the capability including a screen mirroring function and a screen control function; and
  establish connection with the external electronic device according to the capability of the external electronic device,
    wherein the signal related to the plurality of first figures includes information about a configuration of the respective first figures,
  receive a signal related to a plurality of first figures for connection authentication of an external electronic device, the respective first figures corresponding to respective capabilities of the electronic device;
  switch to an input mode, based on the signal;
  receive an input of a second figure corresponding to a first figure among the plurality of first figures in the input mode; and
  transmit a signal related to the input to the external electronic device,
    wherein the signal related to the plurality of first figures includes information about a configuration of the respective first figures.

13. The Non-transitory computer readable medium as claimed in claim 12, wherein the instructions comprise an instruction that causes the processor to identify a similarity between the respective first figures and the second figure.

14. The Non-transitory computer readable medium as claimed in claim 12, wherein the plurality of first figures comprises a figure that can be drawn with a single stroke.

* * * * *